United States Patent [19]

Foley

[11] Patent Number: 4,747,120
[45] Date of Patent: May 24, 1988

[54] AUTOMATIC PERSONNEL MONITORING SYSTEM

[75] Inventor: Steven L. Foley, Ft. Lauderdale, Fla.

[73] Assignee: Digital Products Corporation, Ft. Lauderdale, Fla.

[21] Appl. No.: 765,343

[22] Filed: Aug. 13, 1985

[51] Int. Cl.[4] ............................................. H04M 1/26
[52] U.S. Cl. ........................................ 379/38; 379/49; 379/106
[58] Field of Search ................... 179/2 A, 2 R, 2 AS; 340/825.36, 825.44, 825.49, 306, 573, 576; 379/38, 49, 92, 102, 104, 106, 97, 355, 359

[56] References Cited

U.S. PATENT DOCUMENTS

| | | |
|---|---|---|
| 1,567,209 | 12/1925 | Toomey . |
| 2,209,845 | 7/1940 | Overholt . |
| 3,397,287 | 8/1968 | Ishii et al. . |
| 3,478,344 | 11/1969 | Schwitzgebel ...................... 340/312 |
| 3,483,327 | 12/1969 | Schwartz . |
| 3,564,214 | 2/1971 | Cooper, Jr. . |
| 3,571,799 | 3/1971 | Coken et al. ...................... 179/2 CA |
| 3,648,240 | 3/1972 | Jacoby et al. . |
| 3,752,904 | 8/1973 | Waterbury . |
| 3,872,251 | 3/1975 | Auerbach et al. ................... 179/2 A |
| 3,984,637 | 10/1976 | Caudill et al. . |
| 4,011,409 | 3/1977 | Conrad . |
| 4,069,396 | 1/1978 | Vollnhals et al. . |
| 4,082,921 | 4/1978 | Chomet . |
| 4,126,762 | 11/1978 | Martin et al. . |
| 4,160,125 | 7/1979 | Bower et al. ......................... 379/355 |
| 4,193,061 | 3/1980 | Zoltai . |
| 4,209,783 | 6/1980 | Ohyama et al. . |
| 4,214,127 | 7/1980 | Oules . |
| 4,223,830 | 9/1980 | Walton . |
| 4,236,068 | 11/1980 | Walton . |
| 4,242,663 | 12/1980 | Slobodin . |
| 4,332,980 | 6/1982 | Reynolds et al. . |
| 4,338,601 | 7/1982 | Nance-Kivell . |
| 4,386,266 | 5/1983 | Chesarek . |
| 4,495,496 | 1/1985 | Miller, III . |
| 4,571,455 | 2/1986 | Labock et al. ...................... 179/2 A |
| 4,593,155 | 6/1986 | Hawkins .......................... 340/825.44 |

FOREIGN PATENT DOCUMENTS

| | | |
|---|---|---|
| 0034230 | 8/1981 | European Pat. Off. . |
| 2818955 | 12/1978 | Fed. Rep. of Germany . |
| 57-17262 | 1/1982 | Japan . |
| 8501582 | 11/1985 | World Int. Prop. O. . |

OTHER PUBLICATIONS

ISS Innovative Security Systems-The Home Detention Network brochure.
BI Home Escort TM Electronic Monitoring System brochure.
IBM Technical Disclosure Bulletin entitled "Error Card Identification" by O. L. Hibbard & W. D. Thorne 8/3/60.

*Primary Examiner*—James L. Dwyer
*Attorney, Agent, or Firm*—Lerner, David, Littenberg, Krumholz & Mentlik

[57] ABSTRACT

A monitoring system for indicating the presence of a person at a remote location through a telephone line includes circuitry at a central location for automatically establishing a telephone link between the central and remote locations. A decoder at the remote location produces a verification signal in response to an action performed by the person whose presence is to be indicated. The decoder transmits the verification signal through the telephone line to the central location to indicate the presence of the person at the remote location.

57 Claims, 4 Drawing Sheets

AUTOMATIC PERSONNEL MONITORING SYSTEM

BACKGROUND OF THE INVENTION

The present invention is related generally to electrical communication systems and more specifically to automatic communication systems for monitoring the presence of individual at predetermined locations.

It is desireable in numerous situations to monitor the location of employees or other individuals. For example, in U.S. Pat. No. 4,495,496, a Personnel Monitoring And Locating System is disclosed for use in underground mines. A plurality of remote terminals having transceivers are positioned throughout the mine. Periodically, the remote terminals are activated to transmit interrogation signals. Each miner to be monitored is equipped with a transponder that replies to the interrogation signal with a reply signal. The reply signals are time-delayed by a predetermined amount of time that is different for each of the transponders so that the reply from each transponder is time-spaced with respect to the replies from the other transponders. A host computer at the surface is linked to each remote terminal for activating the remote terminals to transmit the interrogation signals and for receiving the reply signals from the remote terminals which are indicative of the location of each transponder equipped miner.

Another monitoring apparatus is disclosed in U.S. Pat. No. 4,338,601. In that patent, a system is disclosed wherein a watchman carries a portable memory module which he couples to various different stations as he makes his rounds. Each station includes a particular configuration of permanent magnets which provides that station with its own predetermined magnetic code. The portable memory module stores the code of each station as it is visited by the watchman. By reading the information stored in the portable memory module, each station which the watchman visited and the order in which he visited the stations can be determined.

In other situations, it is desireable to monitor individuals other than employees. For example, in U.S. Pat. No. 4,011,409, a system is disclosed in which old or sick persons call a predetermined number at regular intervals. Their calls light an indicator light which informs an attendant that they are allright and have called in. Individuals who have not called in may be called or visited by appropriate personnel.

Over the last several years, with the overcrowding of jails and work-release centers and the increased costs of keeping an individual incarcerated, the application of such techniques to the electronic supervision of criminals has gained increased attention. Benefits, such as relieving overcrowded jails, preventing the incarceration of non-violent criminals or persons guilty of less serious crimes with career criminals, and allowing probation or parole officers to keep track of a substantially larger number of parolees than in the past, have caused greater attention to be focused upon the possibilities of automatic electronic monitoring of parolees. Prior art personnel monitoring systems, however, are not effective for monitoring parolees. Systems such as those disclosed in the '496 patent, which would automatically respond without requiring the parolee to take any action, or the '409 patent, wherein the parolee would merely call a central location from any location having a phone, cannot be used to determine if a parolee is at a given location during a predetermined time period. A system such as that disclosed in the '601 patent would require the parolee to carry a memory module which could be lost, damaged, or tampered with. None of these systems provides the security, reliability, and effectiveness required of a parolee monitoring system.

The designers of parolee monitoring systems are faced with a large number of competing design criteria. First, if the system is used in conjunction with a home telephone of the parolee, the system must not interfere with the normal operation of the telephone. Secondly, the system should be capable of interfacing with the telephone through a minimal number of connections. The system must be simple to operate, effective, and tamper proof to prevent the parolee from defeating the system. In many instances, such design criteria require numerous trade-offs from an engineering standpoint.

It is known to locate equipment in the homes of individuals for the gathering of specific information. Such equipment often uses ordinary telephone lines to transmit the gathered information to another location. For example, in U.S. Pat. No. 4,082,921, a computer at a central office is connected to an automatic answering system at the subscriber's home either with or without ringing the subscriber's telephone. Tones sent by the computer to the automatic answering system are filtered and compared to a reference signal. A connect signal is furnished when the comparator indicates that the tones signifying that particular billing system have been received. The connect signal energizes a relay which connects the billing system to the telephone system. Although such a system can be effected by ringing the subscriber's telephone, it is common to make the connection with the subscriber's billing system without ringing the subscriber's telephone. In this manner, the billing information can be obtained without disturbing the subscriber.

U.S. Pat. No. 4,332,980 discloses a system utilizing transmissions which are transparent to normal telephone service for gathering information regarding alarm surveillance, meter reading, energy management and digital data service. This information is gathered without disturbing the subscriber.

In U.S. Pat. No. 3,483,327, a radio transmitter at the subscriber's home transmits viewing information to a transponder/receiver also located at the subscriber's home. The transponder/receiver s interrogated via telephone lines to obtain the viewing information. This interrogation is performed without disturbing and without the knowledge of the participating subscriber.

Finally, in U.S. Pat. No. 4,126,762, an automatic dialer is used to call a remote station. If the automatic dialer sends appropriate ring signals, the remote station automatically connects a billing processor at the remote station to a data accumulator to thereby provide billing information. The remote station is designed to seize the telephone line and to prevent the telephone from responding with an audible call signal.

Although systems are known wherein equipment is provided at a subscriber location for obtaining desired information, such systems are typically designed to operate without any input from the subscriber, and often times with the subscriber totally unaware that the information is being gathered. Such systems are inapposite to monitoring systems wherein it is necessary for the parolee or other individual being monitored to appropriately respond and thereby confirm his presence at a predetermined location.

SUMMARY OF THE PRESENT INVENTION

The present invention is for a monitoring system for indicating the presence of a person at a remote location through a telephone line. The verification system includes circuitry at a central location for automatically establishing a telephone link between the central and remote locations. A decoder is provided at the remote location for producing a verification signal in response to an action performed by the person whose presence is to be monitored. The decoder transmits the verification signal through the telephone line to the central location to indicate the presence of the person at the remote location.

In one embodiment of the present invention, the decoder includes means for receiving an object. The object may be carried by a bracelet which is worn by the parolee or other individual whose presence is to be indicated. The individual inserts the object into the decoder which responds to the object by uncoupling the remote telephone from the telephone line and coupling the decoder to the telephone line. Such an embodiment increases the security of the system because the individual cannot manipulate the telephone in an attempt to produce signals for defeating the system.

The decoder of the present invention includes a sensor portion and a transmitter portion. The sensor portion is responsive to the inserted object to determine if a code carried by the object is the proper code. If the code is determined to be proper, the verification signal is produced which is transmitted by the transmitter portion of the decoder. A power distribution circuit is included which provides power to either the sensor portion or the transmitter portion. Such a configuration reduces the power consumption of the decoder such that the decoder can operate from the power available through the telephone line. This in turn simplifies the operation of the decoder because the subscriber does not have to continually check batteries or make sure the decoder is plugged into an operational electrical outlet.

According to another embodiment of the present invention, the decoder includes a receiver for receiving signals from the central location. The receiver and transmitter cooperate to produce a security sequence to verify that the central location is in communication with the proper decoder. This again increases the security of the system. These and other advantages and benefits of the present invention will become apparent from the description of a preferred embodiment hereinbelow.

BRIEF DESCRIPTION OF THE DRAWINGS

In order that the present invention may be clearly understood and readily practiced, a preferred embodiment will now be described, by way of example only, with reference to the accompanying drawings wherein.

DESCRIPTION OF A PREFERRED EMBODIMENT

Figure 1:
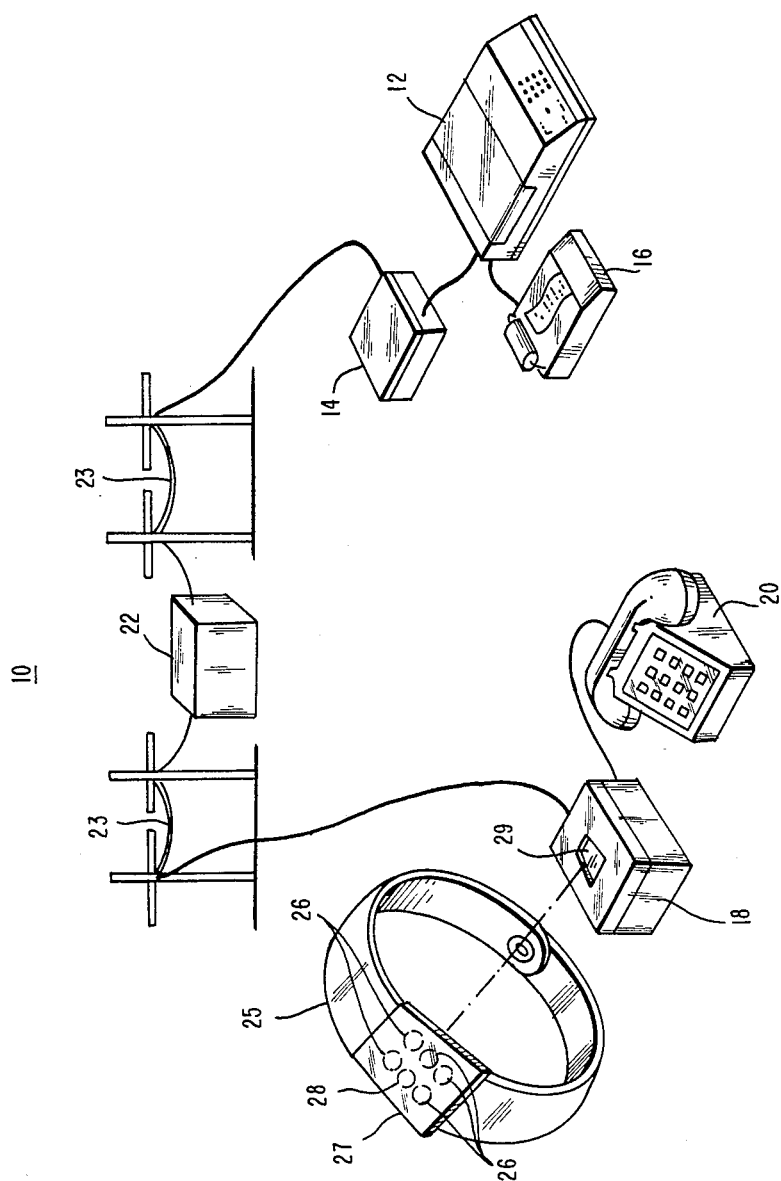
FIG. 1 is a block diagram of an automatic personnel monitoring system constructed according to the teachings of the present invention.

FIG. 1—System Description

In FIG. 1, a block diagram of an automatic personnel monitoring system 10 of the present invention is shown. The system is comprised of an automatic dialer 12, timer 14, and printer 16 located at a central location. The decoder 18 and telephone 20 are positioned at a remote location where the person whose presence is to be monitored is expected to be. The central location is connected to the remote location through a typical telephone exchange 22 and telephone line 23.

The automatic dialer 12 is turned off and on by the timer 14. The dialer 12 is an intelligent automatic dialer which is capable of automatically dialing a large number of predetermined telephone numbers. The dialer 12, upon dialing a predetermined number, can distinguish between a person answering a telephone, a taped message, a telephone intercept generated by the telephone company, a busy signal, and a ringing signal and respond accordingly. One such automatic dialer 12 is known as the Telsol automatic dialer which is available from Digital Products Corporation and which is disclosed and claimed, for example, in U.S. Pat. Nos. 4,160,125; 4,188,510; 4,201,896 and 4,356,348, all of which are hereby incorporated by reference.

The dialer 12 may be connected to a printer 16, which is optional, for printing the results of dialing the predetermined number, i.e., if a person answered, answering machine responded, busy signal was received, etc., as well as the date, time, phone number, etc. Through suitable programming, any and all relevant data may be made available in hard copy form by the printer 16.

A unique bracelet 25 is worn by the individual whose presence is to be monitored. The bracelet 25 may be of the type which is waterproof and which must be cut in order to be removed. Because of this, a probation officer can determine if a probationer has removed or otherwise tampered with the bracelet 25. The bracelet 25 may carry an object 27 or, alternatively, the bracelet 25 and object 27 may be integrally formed. The object 27 carries coded information 26 and, according to one embodiment, a magnet 28 although any suitable start mechanism such as a microswitch or the like may be used. The position of the magnet 28 relative to the coded information 26 may be varied to form a plurality of codes. The decoder 18 is provided with a first portion 29 configured to receive the object 27.

The object 27 carries only inert substances and requires no batteries or power source and is therefore maintenance free. The object 27 is reuseable, tamperproof, and can also be made x-ray proof such that it is extremely difficult for the individual being monitored to obtain any information regarding the coded information 26. By using a plurality of objects 27, a plurality of codes are available and each person being monitored may be assigned his or her own unique code.

In operation, the timer 14 activates the dialer 12 at random times during which the parolee or other individual to be monitored should be at the remote location. The dialer 12 automatically calls the telephone 20 at the remote location thereby establishing a telephone link between the central and remote locations. When the telephone 20 is answered, the dialer 12 will determine if a person has answered, and if so will respond with an announcement instructing the individual at the remote location to insert the object 27 into the first portion 29 of the decoder 18. In addition to providing the announcement, the dialer 12 also times out a predetermined time period of, for example, thirty-two seconds. That time period should be sufficient to enable the person whose presence is to be monitored to reach the decoder 18 in the event that some other person has answered the telephone 20. If at the end of the predetermined time period, the object 27 has not been inserted into the decoder 18, the dialer 12 may be programmed to hand up and to call back later. Such an unsuccessful attempt at contacting the individual whose presence is to be monitored may be appropriately recorded by the printer 16.

The decoder 18 does not respond to incoming and outgoing telephone calls, and is thus non-responsive to ring signals, dial and touchtones, dial pulses, operation of the hook switches of the telephone 20, etc. However, because of the magnet 28 or other start mechanism, the decoder 18 responds to the insertion of the object 27 into the first portion 29 of the decoder 18 by coupling itself to the telephone line 23 and uncoupling the telephone 20 from the telephone line 23. This condition exists long enough for the decoder 18 to determine if the object 27 carries the appropriate coded information 26 and for the decoder 18 and the dialer 12 to perform a handshake sequence which verifies that the dialer 12 is in communication with the proper decoder 18.

The handshake, according to one embodiment to be described in detail later, employs random tones generated by the dialer 12 and appropriate responses quickly generated by the decoder 18 which are almost impossible to predict and duplicate. Upon completion of the analysis of the coded information 26 and the handshake, the decoder 18 uncouples itself from the telephone line 23 and couples the telephone 20 to the telephone line 23.

The printer 16 at the central location may provide a hard copy of the results of the communication, i.e., whether the telephone was answered by a person, an object carrying the proper coded information was inserted, the handshake was completed, etc. The printer may also provide a hard copy of the telephone number dialed, the time of day and date of the call, or any other desired information. By examining this printed information, the probation officer can determine if the parolee or other monitored individual was home at the time at which the dialer 12 called. An optional cassette tape recorder in the dialer 12 serves as a voice back-up record of the calls, including tones, which can be used as needed.

It should be apparent to those of ordinary skill in the art that a large number of decoders 18 and bracelets 25 may be provided within any one calling area. In this manner, the dialer 12 can automatically determine whether each of a large number of parolees is at a predetermined location at a random time within which the parolee is supposed to be at that location. This will enable probation officers to keep track of a larger number of parolees while at the same time providing individual attention to those persons requiring such attention. Additionally, communities will be able to reduce the number of non-violent criminals kept incarcerated, thereby enabling a substantial savings. Also, individuals guilty of non-violent crimes or other less serious matters will not be kept incarcerated with career criminals.

Figure 2:
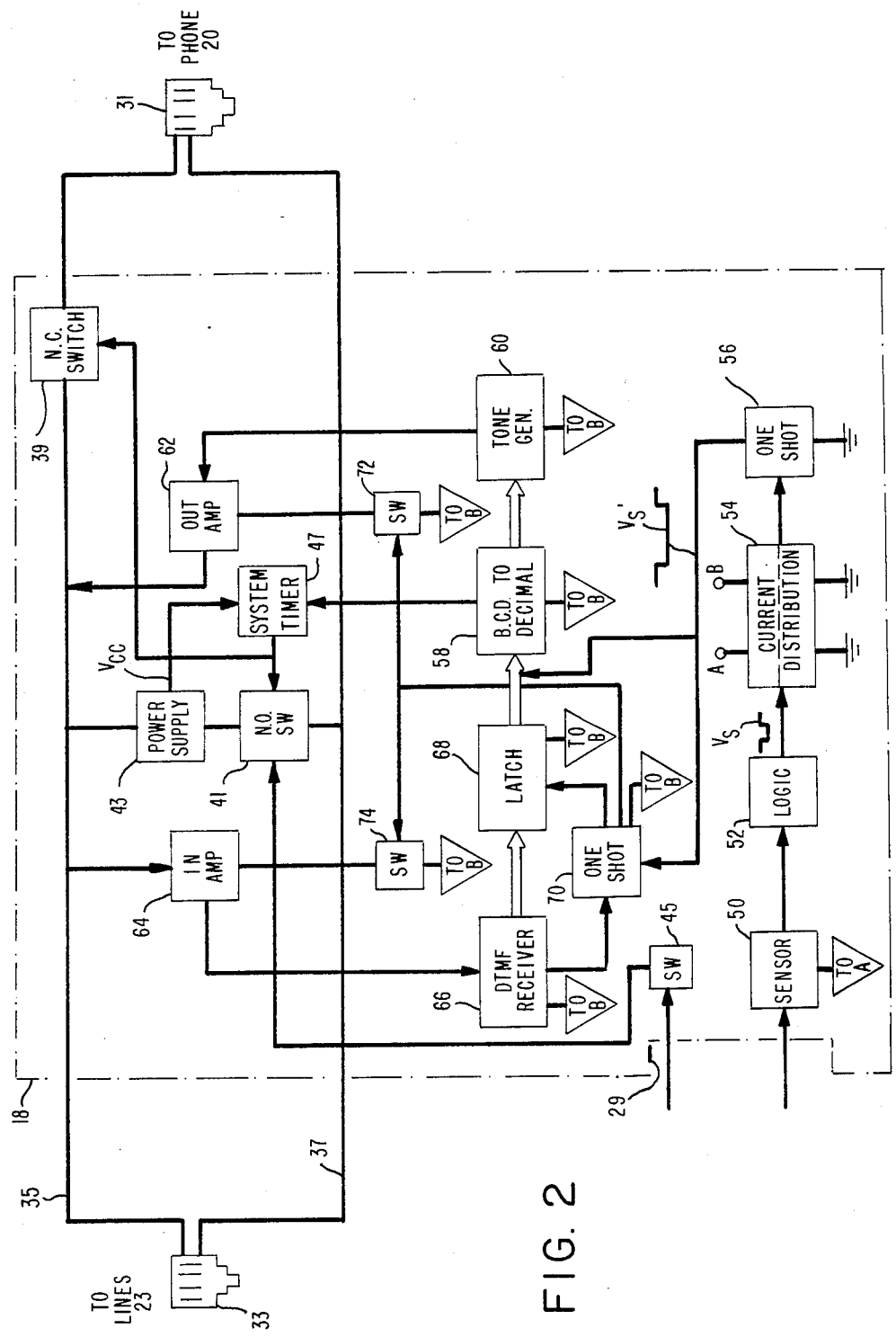
FIG. 2 is a block diagram of the decoder illustrated in FIG. 1.

FIG. 2—Decoder Description

The decoder 18 of FIG. 1 is shown in detail in block diagram form in FIG. 2. The decoder 18 is connected to the telephone 20 at the remote location through a standard four pin connector 31 and is similarly connected to the telephone line 23 through a second standard four pin connector 33, although any type of standard, approved connector can be used. A first conductor 35 extends between the tip pins and a second conductor 37 extends between the ring pins of the first and second connectors, 31 and 33, respectively. The extra pair of conductors 36 and 38, shown in FIG. 3, extending between the unused pins of the first and second connectors pass through the decoder 18 untouched. Conductors 35 and 37 are a pass through of the telephone line 23.

A normally closed switch 39 is connected between the first and second standard connectors, 31 and 33, respectively, along conductor 35. A normally open switch 41 and a power supply 43 are series connected across the first conductor 35 and second conductor 37. The normally open switch is responsive to a reed switch 45, or the like, which is located in the first portion 29 of the decoder 18 and is responsive to the magnet 28 carried by the object 27. The normally open switch 41 is additionally responsive to a system timer 47, which may be comprised of a one shot multivibrator. The timer 47 also controls the operation of the normally closed switch 39.

When the object 27 is inserted in the first portion 29 of the decoder 18, the magnet 28 carried by the object 27 operates the reed switch 45 to momentarily close the normally open switch 41. Closing the normally open switch 41 connects the power supply 43 across conductors 35 and 37. When this occurs, the power supply begins to produce an output voltage $V_{cc}$. The timer 47 is responsive to this output voltage $V_{cc}$ to produce an output signal for maintaining the normally open switch 41 closed and the normally closed switch 39 open. It is during this time that the decoder 18 is coupled to the telephone line and the telephone 20 at the remote location is uncoupled from the the telephone line.

The normally open switch 41 is constructed to be initially responsive to the reed switch 45 for a time period sufficient for the power supply 43 and the timer 47 to become operative. After that time period, the normally open switch 41 is responsive to only the timer 47. Because of this, once the power supply 43 and timer 47 are operative, the parolee or other monitored individual may remove the object 27 from the first portion 29 of the decoder 18, or may reinsert the object 27 into the first portion 29, without affecting the coupling of the decoder 18 to the telephone line and the uncoupling of the telephone 20 from the telephone line. This feature enhances the security of the system and makes it less likely that any activity of the parolee will cause the system to malfunction.

The decoder 18 includes a sensor 50. The sensor 50 is positioned to analyze the object 27 inserted into the first portion 29 of the decoder 18. The configuration of the sensor 50 depends upon the type of object 27 which is inserted and the manner in which the information is coded. Any suitable optical, magnetic, capacitive, etc. coding scheme may be used. It is also anticipated that the object 27 inserted into the first portion 29 of the decoder 18 may include a hand or finger which is sensed by an appropriate sensor 50 to determine if it belongs to the person whose presence is to be monitored. Additional embodiments of the present invention may also include a sensor 50 which is responsive to the parolee's voice to perform an analysis thereon. Clearly, although one particular type of sensor is disclosed hereinbelow in conjunction with FIG. 3, it is anticipated that the principles of the present invention may be used in conjunction with a wide variety of different sensors.

It is also anticipated that the present invention may be used in conjunction with other devices such as a device for analysing breath to determine if the monitored individual has been drinking. Clearly, the present invention provides for a wide variety of monitoring functions.

If the object 27 inserted into the first portion 29 contains the proper coded information 26, a logic circuit 52, responsive to the sensor 50, produces a verification signal $V_s$.

The verification signal $V_s$ propogates through a current distribution circuit 54, the function of which will be described later, and is input to a one shot multivibrator 56. The one shot 56 produces a verification signal $V_s'$ having an expanded width which is input to a binary coded decimal (BCD) to decimal converter 58. The converter 58 produces a decimal signal which is equivalent to the binary coded decimal signal input thereto. A tone generator 60 is responsive to the decimal equivalent signals produced by the converter 58 to produce a single tone signal having a frequency representative of the decimal signal input thereto. The tone signal output by the tone generator 60 is input to an output amplifier 62 which amplifies the tone signal before placing same on the telephone line for transmission to the central location.

In operation, the sensor 50 analyzes the coded information 26 carried by the object 27 which is inserted in the first portion 29 of the decoder 18. If the coded information is correct, the logic circuit 52 produces the verification signal $V_s$. The verification signal propogates through the current distribution circuit and is input to the one shot 56. The one shot 56 produces a verification signal $V_s'$ having an expanded width, thus providing the converter 58 with a signal of sufficient duration to enable the converter 58 to produce the decimal equivalent signal thereof. The decimal equivalent signal representative of the verification signal $V_s$ is input to the tone generator 60. The tone generator 60 produces a single tone signal having a frequency representative of the verification signal $V_s$. This single tone signal is transmitted, after amplification by the output amplifier 62, to the central location. The dialer 12 at the central location receives the single tone signal which it recognizes as being representative of the insertion of an object 27 bearing the proper coded information 26. The reader will recall that in one embodiment the bracelet 25 carrying the object 27 is nonremoveably attached to the parolee or other individual.

Upon completion of the transmission of the single tone signal representative of the verification signal $V_s$, the system 10 performs a security sequence, or handshake, to verify that the dialer 12 is in communication with the proper decoder 18. Although in this embodiment the handshake is performed after production of the verification signal $V_s$, the handshake may be performed either before or after production of the verification signal $V_s$, or both, and may take any of a large number of formats. In one embodiment, the handshake is accomplished by the central location's generation of a random dual tone multi-frequency (hereinafter DTMF) signal from one to eight which is received by the decoder 18. The decoder 18 responds by transmitting a corresponding single tone signal assigned to represent the received DTMF signal. This reception and response is accomplished by an input amplifier 64, a DTMF receiver 66, a latch 68, and a one shot multi-vibrator 70 which operate in conjunction with the converter 58, tone generator 60, and output amplifier 62.

In the embodiment shown in FIGS. 1 and 2, once the dialer 12 recognizes that the single tone signal representative of the verification signal $V_s$ has stopped, the dialer 12 is programmed to generate a random DTMF signal. The input amplifier 64 receives a DTMF signal generated at the central location by the dialer 12. The signal received by the input amplifier 64 is input to the DTMF receiver 66 which converts the received DTMF signal into a binary signal. The one shot 70 is responsive to the receiver 66 and controls the latch 68. The one shot 70 controls the latch 68 such that it receives the binary signal from the receiver 66 and holds that binary signal at its output terminals for a sufficient period of time for the converter 58 to produce the decimal equivalent signal thereof. While the decimal equivalent signal is presented, the tone generator 60 produces a single tone signal representative thereof which is transmitted back to the central location through the output amplifier 62. In this manner, dialer 12 generates random DTMF signals and expects to receive from the decoder 18 a corresponding single tone signal. By generating a random DTMF signal and receiving the corresponding single tone signal, for example, three times within a two second time period, the handshake between the central and remote location becomes almost impossible to predict and defeat.

As discussed above, the system timer 47 maintains the normally open switch 41 closed, the power supply 43 operative, and the normally closed switch 39 open, for a length of time sufficient for the decoder 18 to produce the verification signal $V_s$, transmit a single tone signal representative thereof to the central location, and perform the necessary handshake with the central location. Upon completion of the handshake, the central location may transmit a predetermined DTMF signal which is recognized by the decoder 18 as an end signal. The DTMF signal recognized as the end signal indicates to the decoder 18 that a proper verification signal $V_s$ has been produced and the handshake has been completed. The DTMF signal assigned as the end signal is processed by the decoder 18 as any other received DTMF signal except that the decimal equivalent signal of this DTMF signal is input to the timer 47. The timer 47 then allows the normally open switch 41 to return to its open position de-energizing the power supply 43 and allows the normally closed switch 39 to return to its normally closed position. In this manner, the central location terminates the activity of the decoder 18 which then uncouples itself from the telephone line 23 and recouples the telephone 20 of the remote location to the telephone line 23. Thereafter, the telephone 20 once again operates as a normal telephone.

In the alternative, if the verification signal $V_s$ and/or the handshake are not completed within the time period set by the timer 47, the timer 47 allows the normally open switch 41 to return to its open condition thereby de-energizing the power supply 43 and allows the normally closed switch 39 to return to its normally closed position. This incouples the decoder 18 from the telephone line 23 and recouples the telephone 20 to the telephone line 23. The dialer 12 recognizes that the decoder has not produced the verification and/or handshake within the allotted time. The printer 16 at the central location provides an appropriate printed record, i.e., that either the verification signal was not produced or the verification signal was produced but the handshake was not completed within the time period provided. This information may then be the basis for additional action taken by the probation officer.

It is recognized that a decoder 18 may be provided with batteries or a power supply connectable to a standard electrical outlet. However, to make the decoder simpler to operate, from the parolee's point of view, it is advantageous to provide a decoder 18 which operates from the power available through the telephone line 23. With such an embodiment, the decoder 18 requires no maintenance and there is no chance of missing a call during a power failure. However, because the power available through the telephone line 23 is generally low, steps must be taken to insure proper operation of the decoder 18.

The decoder 18 is provided with a current distribution circuit 54. The sensor 50 is connected to the power supply 43 through a connection not shown and is connected to the current distribution circuit 54 at an input terminal A. The converter 58, tone generator 60, DTMF receiver 66, latch 68, and one shot 70 are each connected to the power supply 43 through a connection not shown and to the current distribution circuit 54 at an input terminal B. The current distribution circuit is operative to connect either input terminal A to ground or input terminal B to ground. In this manner, either the sensor is connected to ground thereby providing it with power or the receiver and transmitter portions of the decoder 18 are connected to the ground thereby providing those portions of the decoder 18 with power. Such power distribution is advantageous because the decoder 18 operates solely from the power received from the telephone line 23. Because this is source of low power, it is desireable to provide power to only those portions of the decoder 18 which are necessary at that time for its proper operation. Therefore, upon initial startup, the current distribution circuit 54 connects terminal A to ground such that the sensor 50 is operative. However, upon production of the verification signal $V_s$, the terminal A is disconnected from ground and the terminal B is connected to ground by the current distribution circuit 54. In this manner, the sensor 50 is disabled and the transmitter and receiver portions of the decoder 18 are provided with power.

For similar reasons, the output amplifier 62 is connected to the terminal B through a switch 72 and the input amplifier 64 is connected to the terminal B through a switch 74. The switches 72 and 74 are responsive to the one shot 70. When the one shot 70 is operating the latch 68, the DTMF signal has already been received. Therefore, the one shot 70 is operative to open switch 74 and close switch 72 such that the output amplifier 62 will receive power for amplifying the corresponding single tone signal responsive to the received DTMF signal. After the single tone signal is amplified by output amplifier 62, the one shot 70 is operative to open switch 72 and close switch 74 to enable the decoder 18 to receive another DTMF signal through input amplifier 64. This operation again allows power to be supplied only to those portions of the decoder necessary for its power operation at that time.

SUMMARY OF SYSTEM OPERATION

The operation of the security system 10, as well as the decoder 18, may be summarized as follows:

Timer 14 turns on dialer 12 at random times during a time period when monitored individuals should be at the predetermined location where telephone 20 is located;

Dialer 12 dials the telephone number of remote telephone 20 to establish a telphone link between the central and remote locations;

The individual answers the telephone 20 and receives a message from Telsol 12 that the object 27 carried by the bracelet 25 should be inserted into the decoder 18;

If no one answers, the dialer 12 may be programmed to call back or simply note that there was no response;

Upon insertion of the object 27 into the decoder 18, switch 45 is operative to cause normally open switch 41 to momentarily close, thereby connecting power supply 43 to the telephone line;

Power supply 43 produces an output voltage Vcc which causes timer 47 to hold the normally open switch 41 closed and to hold the normally closed switch 39 open;

Sensor 50 is connected through the current distribution circuit 54 to ground and analyzes the object 27 to determine if the proper predetermined coded information 26 is present;

If the proper predetermined coded information 26 is present, logic circuit 52 produces the verification signal $V_s$;

The verification signal $V_s$ propagates to the current distribution circuit 54 disconnecting terminal A from ground and connecting terminal B to ground at substantially the same time it is input to one shot 56;

One shot 56 inputs an expanded verification signal $V_s'$ into converter 58 which produces a corresponding decimal signal;

Tone generator 60 produces a single tone signal representative of the corresponding decimal signal which is transmitted via output amplifier 62 to the dialer 12 at the central location;

Dialer 12, in response to the end of the verification signal $V_s$, generates a random DTMF signal which is received by the input amplifier 64 and DTMF receiver 66 of the decoder 18;

The received DTMF signal is input from the receiver 66 to the converter 58 through the latch 68 operated by the one shot 70;

One shot 70 disables the input amplifier 64 by opening switch 74 and enables the output amplifier 62 by closing switch 72;

Converter 58 produces a decimal equivalent signal which corresponds to the received DTMF signal;

Tone generator 60 produces a single tone signal representative of the decimal equivalent signal which is transmitted via output amplifier 62 to the dialer 12 at the central location;

When this response is over, the one shot 70 disables output amplifier 62 and re-enables input amplifier 64;

Dialer 12 repeats the process of generating the random DTMF signal and receiving a corresponding single tone signal a predetermined number of times to verify that the central location is in communication with the proper decoder 18;

Dialer 12 transmits the DTMF signal assigned as the end signal;

The decimal equivalent signal representative of the DTMF signal assigned as the end signal is input to system timer 47;

System timer 47 allows normally open switch 41 and normally closed switch 39 to return to their normal conditions thereby uncoupling decoder 18 from the telephone line 23 and coupling telephone 20 to the telephone line 23; and Printer 16 provides a written indication of the time, date, telephone number called, production of the verification signal, and completion of the handshake.

Figure 3:
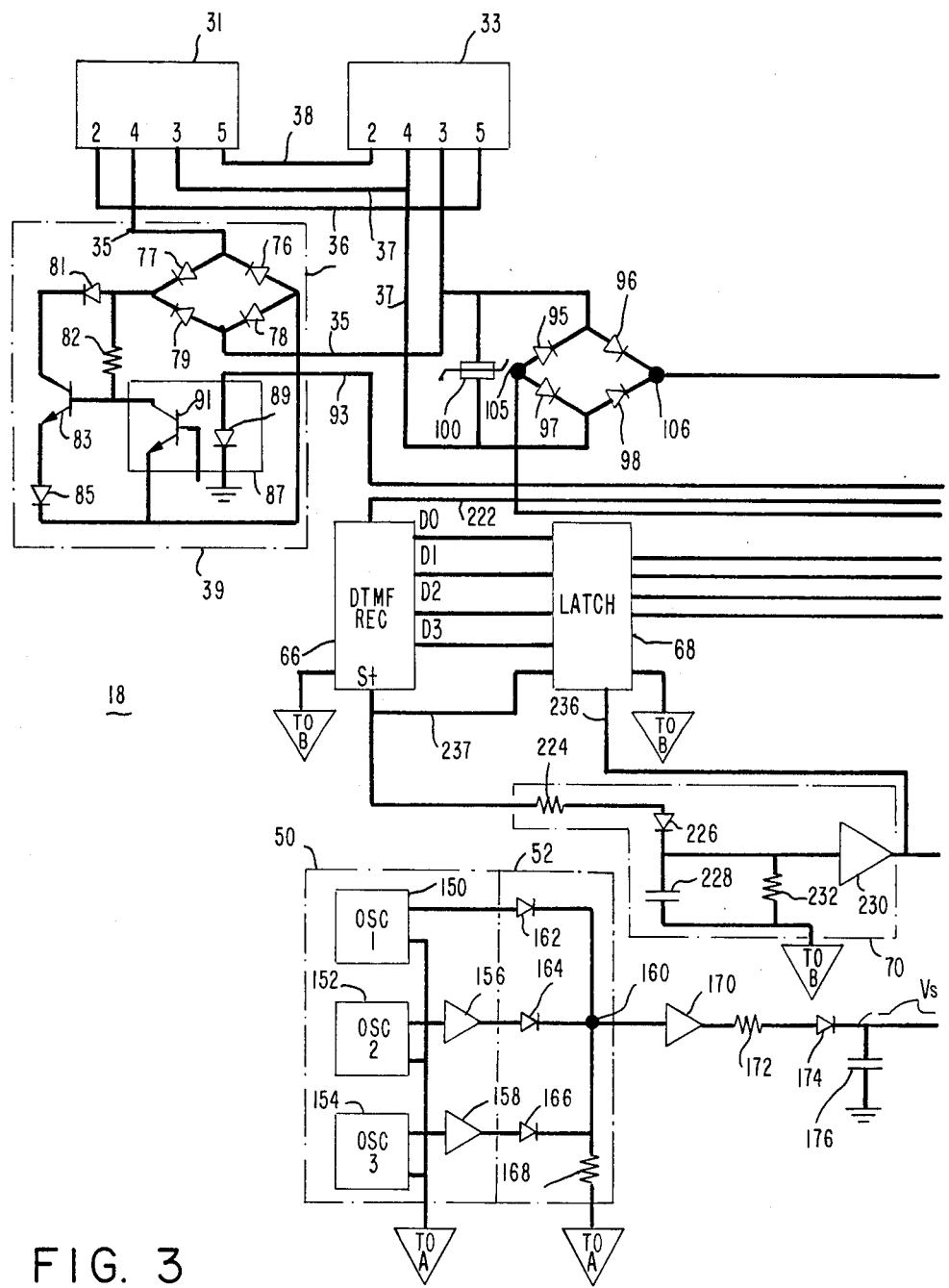
FIG. 3 (1 of 2 and 2 of 2) is an electrical schematic of the decoder illustrated in FIG. 2.
Figure 3:
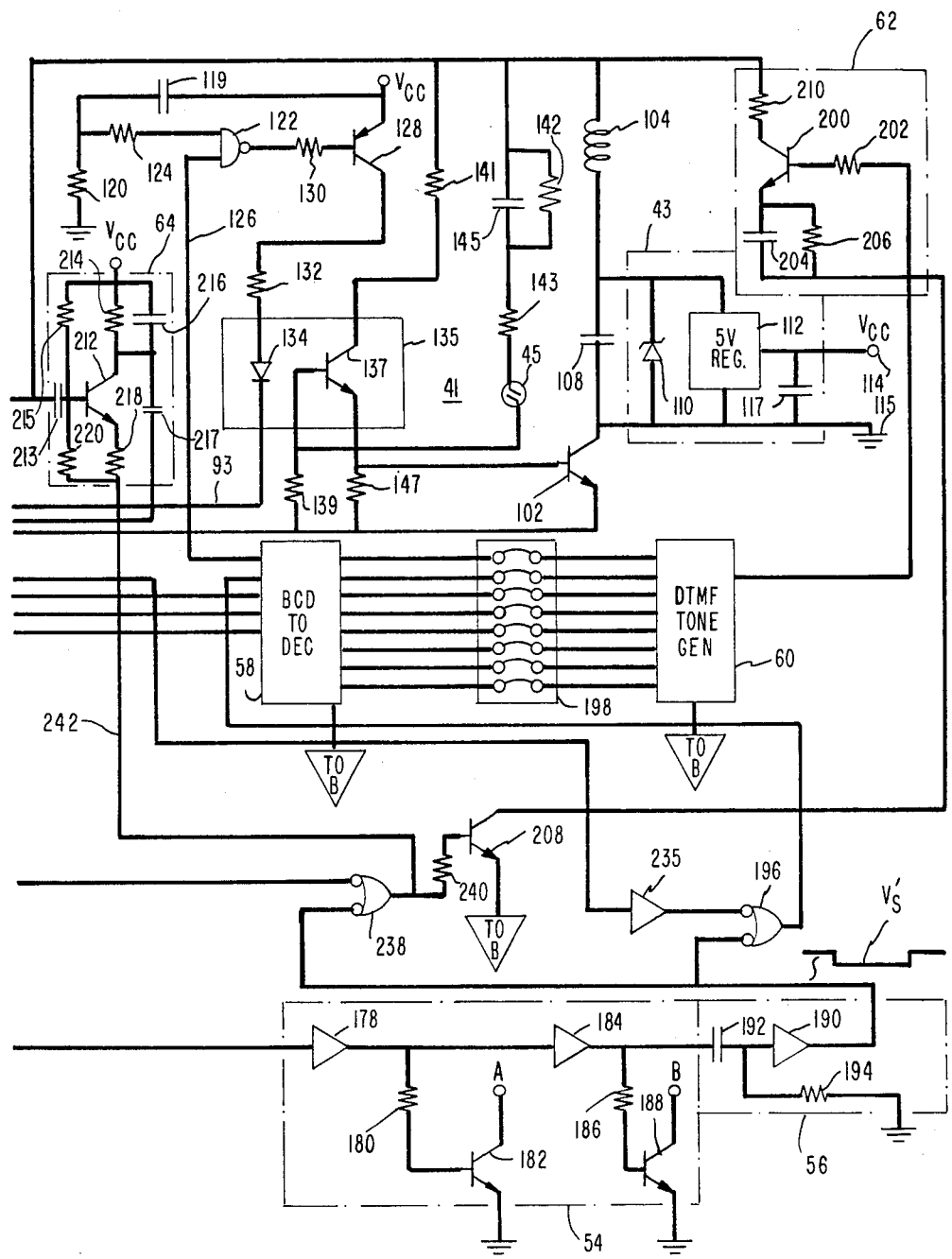

Of course, if the verification signal is not produced, or if the handshake is not properly completed, that is recognized by the dialer 12 and appropriate information is recorded by printer 16 for further use. In either event, the dialer 12 may proceed to automatically call another telephone 20 at another remote location. In this manner, a record can be provided regarding whether a large number of parolees were each at predetermined locations within specified time periods. FIG. 3—Detailed Decoder Description Turning to FIG. 3, an electrical schematic of the decoder 18 illustrated in FIG. 2 is shown. Certain connections to the power supply, connections to a system oscillator, etc. have been eliminated in an effort to simplify the following explanation. Such connections, however, will be readily apparent to those of ordinary skill in the art.

In FIG. 3, the connectors 31 and 33 are shown in the upper left-hand corner of the figure. The appropriate connector, RJ11C, is used to maintain telephone standards. A movister 100 is connected across the conductors 35 and 37 to suppress transients across the telephone line.

a. Normally Closed Switch 39

The conductor 35 extends from the normally closed switch 39 to connectors 31 and 33. The normally closed switch 39 is comprised of four diodes 76, 77, 78, and 79 forming a diode bridge, two diodes 81 and 85, a resistor 82, transistor 83, and an optical coupler 87. The diodes 76 and 77 are series connected as are the diodes 78 and 79. The anodes of the diodes 76 and 78 are connected together as are the cathodes of diodes 77 and 79 to form the diode bridge. The junction between the anode of diode 77 and the cathode of diode 76 is connected by conductor 35 to connector 31. The junction between the cathode of the diode 78 and the anode of the diode 79 is connected by conductor 35 to connector 33. The junction of the cathodes of the diodes 77 and 79 is connected to a collector terminal of the transistor 83 through a forward biased diode 81 and is connected to a base terminal of the transistor 83 through the resistor 82. An emitter terminal of the transistor 83 is connected to the junction of the anodes of the diodes 76 and 78 through a forward biased diode 85.

The optical coupler 87 is comprised of a light emitting diode 89 and light sensitive transistor 91. The light emitting diode 89 is connected at its anode to a conductor 93 and at its cathode to ground. The light sensitive transistor 91 is internally responsive to the light emitting diode 89. A collector terminal of the transistor 91 is connected to the base terminal of the transistor 83 and an emitter terminal of the transistor 91 is connected to the junction of the anodes of the diodes 76 and 78.

The bridge comprised of diodes 76, 77, 78 and 79 establishes the D.C. polarity for the components used to form the normally closed switch 39. When the power supply 43 of the decoder 18 is not activated, the transistor 83 is normally saturated by current through the resistor 82 which is connected to the diode bridge. Under these conditions, the telephone 20 is connected to the telephone line 23 and operates as a normal phone completely unaffected by the decoder 18. However, when the power supply 43 of the decoder 18 is operative, a current flows through conductor 93. This current causes the transistor 91 to be conductive thereby shorting the base terminal of the transistor 83 to its emitter terminal. As long as the power supply 43 of the decoder 18 is operative, current flows through the conductor 93 maintaining the transistor 83 in the open circuit state. Under these conditions, the telephone 20 is uncoupled from the telephone line 23 and remains uncoupled until the power supply 43 stops producing the output voltage $V_{cc}$. Diodes 81 and 85 are used to establish voltage drops in order to guarantee proper saturation and open circuit conditions of the transistor 83.

b. Normally Open Switch 41, AC Interface, and System Timer 47.

The normally open switch 41 is comprised of four diodes 95, 96, 97, and 98 forming a diode bridge, a transistor 102, resistors 132, 139, 141, 142, 143, 147, a capacitor 145, an optical coupler 135, and reed switch 45. The diodes 95 and 96 are series connected as are the diodes 97 and 98. The anodes of the diodes 95 and 97 are connected together at a negative terminal 105. Similarly, the cathodes of the diodes 96 and 98 are connected together at a positive terminal 106. The junction between the cathode of diode 95 and the anode of the diode 96 is connected to the conductor 35. The junction between the cathode of the diode 97 and the anode of the diode 98 is connected through the conductor 37 to connector 33. Because the polarity of the telephone line 23 cannot be predetermined, it is established by the bridge comprised of the diodes 95 through 98.

Connected across negative terminal 105 and positive terminal 106 of the diode bridge is the series combination of an inductor 104, capacitor 108, and the transistor 102. The capacitor 108 is connected to a collector terminal of the transistor 102. An emitter terminal of the transistor 102 is connected to the negative terminal 105. The inductor 104 and capacitor 108 serve as an AC interface to the telephone line. For maximum power transfer, the AC off hook impedance of inductor 104 and capacitor 108 may be approximately six hundred ohms. The transistor 102 is part of the normally closed switch 41 as mentioned earlier.

The system timer 47 is comprised of a capacitor 119 series connected with a resistor 120 between the power supply voltage $V_{cc}$ and ground. The junction between the capacitor 119 and resistor 120 is connected to an input terminal of a NAND gate 122 through a resistor 124. A second input terminal of the NAND gate 122 is connected through a conductor 126 to an output terminal of the converter 58. An output terminal of the NAND gate 122 is connected to a base terminal of a transistor 128 through a resistor 130. An emitter terminal of the transistor 128 is connected to the supply voltage $V_{cc}$. A collector terminal of the transistor 128 is connected to the conductor 93 through the series connection of the resistor 132 and a light emitting diode 134 of the optical coupler 135. The reader will recall that the resistor 132 and optical coupler are a part of the normally open switch 41.

Returning now to the description of the normally open switch 41, the optical coupler 135 also includes a light sensitive transistor 137 having a base terminal connected through the resistor 139 to the negative terminal 105, an emitter terminal connected to the base terminal of the transistor 102, and a collector terminal connected through the resistor 141 to the positive terminal 106. The base terminal of the transistor 137 is further connected to positive terminal 106 through the series combination of the reed switch 45, the resistor 143, and the capacitor 145 in parallel with the resistor 142. The emitter terminal of the transistor 137 is further connected to the negative terminal 105 through the resistor 147.

c. Power Supply 43

The power supply 43 is comprised of a zener diode 110 and a five volt voltage regulator 112 each connected in parallel with capacitor 108. The supply voltage $V_{cc}$ is available across output terminals 114 and 115. A filtering capacitor 117 is connected across the output terminals 114 and 115.

The power supply 43 is connected across the conductors 35 and 37 when transistor 102 is saturated. The voltage regulator 112, the zener diode 110, and the filtering capacitor 117 establish a DC load across the conductors 35 and 37. The voltage regulator 112 establishes a fixed five volt supply voltage $V_{cc}$ which is used throughout the decoder 18. The voltage regulator 112 will maintain regulation until its input voltage is exceeded. However, the zener diode 110 prevents the input voltage of the voltage regulator 112 from reaching its maximum voltage and bypasses any excess currents which the voltage regulator 112 does not require. This configuration allows the decoder 18 to receive power from telephone lines having low or high loop resistances. The filtering capacitor 117 maintains a stable supply voltage despite voltage fluctuation across the conductors 35 and 37, short breaks in the telephone line current, and prevents the voltage regulator 112 from oscillating.

d. Operation of Normally Closed Switch 39, Normally Open Switch 41, and System Timer 47

In operation, when the object 27 is inserted in the first portion 29 of the decoder 18, the magnet 28 carried by the object closes the reed switch 45. This closure allows transistor 137 to become conductive which in turn allows transistor 102 to become conductive. When transistor 102 is conductive, the power supply 43 is connected across conductors 35 and 37 and begins to produce the output voltage $V_{cc}$. The transistors 137 and 102 will remain conductive due to closure of the reed switch 45 for a time period determined by the values of the resistor 143 and capacitor 145. In one embodiment, this time period is approximately one half second. Within that time, capacitor 145 will charge. When the capacitor 145 is charged, no more current flows through the resistor 143 and reed switch 45 to the base of the transistor 137. Resistor 142 will begin to slowly discharge capacitor 145 so the decoder 18 can be reactivated. However, by the time capacitor 145 has charged, the supply voltage $V_{cc}$ is available at the output terminals 114 and 115 and the transistor 137 is maintained in the conductive state by the timer 47. The resistor 143 and capacitor 145 also protect the contacts of the reed switch 45 from ringing voltages that are sometimes present across the telephone line.

With the supply voltage $V_{cc}$ available, capacitor 119 rapidly charges, and then begins to discharge through resistor 120. While the capacitor is discharging, the input terminal of the NAND gate 122 is receiving a high signal. The other input terminal is also receiving a high signal such that a low output signal is available at the output terminal of the NAND gate 122. This low signal renders transistor 128 conductive allowing current to flow through the transistor 128, resistor 132, light emitting diode 134, conductor 93, and light emitting diode 89. This current holds the transistor 137 conductive even after the current flowing by virtue of closure of the reed switch 45 has ceased. This same current, which holds transistor 137 conductive, holds the transistor 91 conductive. In this manner, while the normally open switch 41 is held closed, the normally closed switch 39 is held open. This guarantees that while the power supply 43 is connected to the telephone line, the remote telephone 20 will be disconnected from the telephone line. If either signal input to the NAND gate 122 changes state, the output signal will also change state thereby rendering transistor 128 non-conductive.

The disconnection of the remote telephone 20 from the telephone line 23, for muting of the remote telephone 20, provides some additional guarantees against inadvertent failure as well as attempts to defeat the system. The muting feature eliminates the additional DC load that the remote telephone 20 presents. Thus, the risk of decoder failure due to lack of sufficient current is eliminated. It also adds the requirement that no other telephone be off hook on the same line while the decoder 18 is operative. The mute feature greatly attenuates the audio signals from the remote telephone 20. Because only a small trickle of current is supplied to the remote telephone 20, noise from the telephone or attempts to generate counterfeit single tone response signals cannot be added to the telephone line. The mute feature also greately attenuates the audio signals to the remote telephone 20. This allows the decoder 18 to produce single tone response signals of maximum strength which may be transmitted to the dialer 12 at the central location while maintaining a comfortable audio level for the parolee. It is also almost impossible for the parolee to hear the DTMF signals generated by the Telsol 12 because of their signal strength. By matching the six hundred ohm load of the telephone line, maximum power transfer between the telephone line and the decoder 18 is established. This is due in part to the mute feature which eliminates any significant AC loading that the remote telephone 20 may present.

The time during which the power supply 43 is connected to the telephone line 23 and the remote telephone 20 is disconnected or muted from the telephone line 23 is determined by the values for the resistor 120 and capacitor 119. In one embodiment, it is anticipated that it will take approximately ten seconds for the capacitor 119 to discharge. Once the capacitor 119 discharges, the output signal available at the output terminal of the NAND gate 122 becomes high, rendering the transistor 128 non-conductive. In turn, this causes transistors 137 and 91 to become non-conductive thereby allowing normally open switch 41 to return to its normally open condition and normally closed switch 39 to return to its normally closed position.

When the decoder 18 is activated, a substantial amount of current passes through the transistor 102. This transistor must be sized to handle up to one hundred and fifty milliamps of collector current which is associated with the loop current of the telephone line. Due to ringing voltage that could be in excess of one hundred thirty volts RMS plus a fifty-six volt DC talk battery, the transistor 102 must have a high breakdown voltage.

DC leakage across the conductors 35 and 37 must be below Federal Communication Commission specifications when the telephone line is in the on hook condition. The resistors 139 and 137 guarantee that the optical coupler 135 and the transistor 102 are held non-conductive when the decoder 18 is not activated.

The other input of the NAND gate 122 receives a signal from the converter 58 through a conductor 126. If the verification signal has been produced, and the handshake completed, the central location may turn the decoder 18 off before the system timer is timed out. By transmitting an appropriate DTMF signal which the decoder 18 recognizes as an end signal, the decoder 18 may be turned off. This is accomplished by the converter 58, converting the DTMF signal into a corresponding decimal signal which is input to the other input terminal of the NAND gate 122. This causes the signal available at the output terminal of the NAND gate 122 to go high, thereby rendering the transistor 128 non-conductive. This, as discussed above, allows the normally open switch 41 and the normally closed switch 39 to return to their normal conditions. The transistor 128 is used because the NAND gate 122 cannot directly source enough current for the optical couplers 135 and 87. Resistor 124 is provided to current limit any over voltage that may occur through the clamping diodes within the NAND gate 122.

e. Sensor 50

In FIG. 3, the sensor 50 is shown in the lower left hand portion of the figure. The sensor used in this embodiment is comprised of a first oscillator 150, a second oscillator 152, and a third oscillator 154, each oscillating at different frequencies to prevent cross-talk. Each oscillator contains a coil in the form of a foil spiral (not shown) which is located in specific areas within the first portion 29 of the decoder 18. The foil spirals line up with the coded information 26 when the object 27 is properly inserted.

In one embodiment, the coded information is either a sliver of a metallic material or a blank. When the sliver material is lined up with a foil spiral of an oscillator, the oscillator ceases to oscillate. When a blank is lined up with a foil spiral of an oscillator, the oscillator continues to oscillate. Such an oscillator is disclosed and claimed in U.S. application Ser. No. 625,081 filed June 27, 1984, and assigned to the same Assignee as the present application. U.S. application Ser. No. 625,081 is hereby incorporated by reference.

The signal output from each of the oscillators 150, 152, and 154 is a DC voltage. When the oscillator is oscillating, the DC voltage is low. When the oscillator is not oscillating, the DC voltage is high. Thus, the change in these DC output signals can be used to determine if the proper object 27 has been inserted into the decoder 18.

An output terminal of the oscillator 150 is connected through a diode 162 to a node 160. An output terminal of the oscillator 152 is connected through the series combination of an inverter 156 and a diode 164 to the node 160. An output terminal of the oscillator 154 is connected through the series combination of an inverter 158 and a diode 166 to the node 160. Each oscillator is grounded by the terminal A of the current distribution circuit 54. The node 160 is grounded by terminal A through a resistor 168. The diodes 162, 164 and 166 and resistor 168 forming node 160 perform the function of the logic circuit 52 shown in FIG. 2.

In order for the verification signal $V_s$ to be produced, all the signals avalable at node 160 must be low for a predetermined period of time. Under normal conditions with all three oscillators oscillating, the output signal from each oscillator is low, but the output signal from the oscillators 152 and 154 is inverted so that these oscillators provide a high signal to the node 160. Therefore, the object 27 carried by the bracelet 25 must have sliver materials positioned to stop the second oscillator 152 and the third oscillator 154 from oscillating. If that condition is met, the output signal from the oscillator 150 is low, the output signal from the oscillator 152 is high but is inverted by inverter 156, and the output signal from the oscillator 154 is high but is inverted by the inverter 158. Therefore, all the signals at the node 160 will be in the low state. Again this will only occur upon insertion of an object 27 properly coded with sliver material which stops the proper two oscillators from oscillating.

The signal of node 160 is input to an inverter 170 which acts as a buffer. An output terminal of the inverter 170 is connected to ground through the series combination of a resistor 172, diode 174, and capacitor 176. The resistor 172 and capacitor 176 act as a delay/debounce circuit. The verification signal $V_S$ is generated across capacitor 176 after passage of the time constant determined by the values of resistor 172 and capacitor 176. The diode 174 keeps the charge on the capacitor 176. When the capacitor 176 has been sufficiently charged, the verification signal propagates through the current distribution circuit 54.

f. Current Distribution Circuit 54 and One Shot 56

The current distribution circuit 54 is comprised of a first inverter 178 responsive to the voltage across the capacitor 176. An output terminal of the inverter 178 is connected through a resistor 180 to a base terminal of a transistor 182. A collector terminal of the transistor 182 is connected to the terminal A and an emitter terminal of the transistor 182 is connected to ground. A second inverter 184 is responsive to the output terminal of the first inverter 178. An output terminal of the second inverter 184 is connected through a resistor 186 to a base terminal of a transistor 188. A collector terminal of the transistor 188 is connected to the terminal B and an emitter terminal of the transistor 188 is connected to ground.

In operation, before the capacitor 176 is charged, the signal available at the output terminal of the inverter 178 is high and the signal available at the output terminal of the inverter 184 is low. The high signal maintains the transistor 182 in a conductive state such that the sensor 50 is connected to ground. However, the low signal available at the output terminal of the inverter 184 maintains the transistor 188 non-conductive. Thus, the remainder of the circuitry connected to the terminal B is not supplied with power. When the capacitor 176 is sufficiently charged, the signal available at the output terminal of the inverter 178 becomes low and the signal available at the output of the inverter 184 becomes high. Thus, the transistor 182 is rendered non-conductive and the transistor 188 is rendered conductive by virtue of the verification signal $V_S$ propagating through the current distribution circuit 54. The verification signal disconnects the sensor 50 from ground and connects the remainder of the circuitry to ground. In this manner, power is conserved by only supplying power to those portions of the circuit necessary for proper operation of the decoder 18.

The verification signal $V_s$ is input from the current distribution circuit 54 to an input terminal of an invertor 190 through a capacitor 192. The input terminal of the inverter 190 is connected to ground through a resistor 194. The invertor 190, capacitor 192, and resistor 194 cooperate to provide the function of the one shot 56 shown in FIG. 2. The expanded verification signal $V_s'$ is available at an output terminal of the inverter 190.

g. Converter 58, Tone Generator 60, and Output Amplifier 62

The verification signal $V_s'$ is input to the converter 58 through a NAND gate 196. The converter 58 produces a decimal equivalent signal which is input to the tone generator 60 through a jumper connection 198. The tone generator 60 may be a DTMF tone generator which produces one of eight audio frequency tones, depending upon the configuration of the jumpers 198, when any of the eight input terminals is pulled low. A standard touch tone dialing plan is illustrated below in Table 1. The tone generator 66 is capable of producing any of the four row or four column tones.

TABLE 1

| ROWS (Hz) | COLUMNS (Hz) | | | |
|---|---|---|---|---|
| | 1209 | 1336 | 1479 | 1633 |
| 697 | 1 | 2 | 3 | A |
| 770 | 4 | 5 | 6 | B |
| 853 | 7 | 8 | 9 | C |
| 941 | * | 0 | # | D |

Thus, the expanded verification signal $V_s'$ is converted by converter 58 to a decimal equivalent signal. In response to the decimal signal, the tone generator 60 outputs a single row or single column tone representative thereof.

The tone signal generated by the tone generator 60 is input to output amplifier 62. The output amplifier 62 includes a transistor 200 receiving the single tone signal at a base terminal thereof through a resistor 202. An emitter terminal of transistor 200 is connected to the parallel combination of a capacitor 204 and resistor 206. The other end of the parallel combination of the capacitor 204 and resistor 206 is connected to a collector terminal of a transistor 208 which performs the function of the switch 72 in FIG. 2. The emitter of the transistor 208 is connected to the terminal B. Returning to the output amplifer 62, the collector terminal of the transistor 200 is connected to the positive terminal 106 through a resistor 210.

For the output amplifier 62 to be operative to transmit the single tone signal to the central location, not only must the terminal B be connected to ground through the transistor 188, but the transistor 208 must also be saturated.

The gain of the amplifier 62 is set by the value of the resistor 210 plus the loop resistance in the telephone line divided by the equivalent resistance of the parallel combination of capacitor 204 and resistor 206. The amplifier 62 is connected in parallel with the AC telephone interface made up of the inductor 104 and capacitor 108, discussed above.

h. Input Amplifier 64, Reciever 66, and Latch 68

When the dialer 12 receives the proper single tone signal, it recognizes that the proper bracelet 25 carrying the object 27 has been inserted into the decoder 18. The dialer 12 then generates a random signal, which in this embodiment is a DTMF signal, that is received by the decoder 18 at the input amplifier 64. The input amplifier 64 is comprised of a transistor 212 having a base terminal connected to the positive terminal 106 through a capacitor 213. A collector terminal of the transistor 212 is connected to the supply voltage $V_{cc}$ through the parallel combination of a resistor 214 and a capacitor 216. An emitter terminal of the transistor 212 is connected to the output terminal of a NAND gate 238 through a resistor 218. The base terminal of the transistor 212 is connected to the output terminal of the NAND gate 238 through a resistor 220 and to the supply voltage $V_{cc}$ through a resistor 215. The received DTMF signal is available at the collector terminal of the transistor 212 and is input to the DTMF receiver 66 via a conductor 222 through a capacitor 217.

The capacitor 213 acts as a coupler between the transistor 212 and the telephone line and a low frequency filter. The DC gain of the amplifier 64 is set by the ratio of the values of resistors 214 and 218. The AC gain of the amplifier 64 is set by ratio of the equivalent resistance of the parallel combination of resistor 214 and capacitor 216 to the value of the resistor 218.

The DTMF receiver 66 may include a receiver which utilizes switch-capacitor and digital frequency measuring techniques to convert the signals received on conductor 222 from the input amplifier 64 into binary data. When a valid DTMF signal is present on a signal input terminal, the appropriate binary coded decimal data is made available at data output terminals $D_0$–$D_3$ and a strobe signal is output at a strobe output terminal ST.

The strobe signal is input to the one shot 70. The one shot 70 is comprised of resistors 224 and 232, a diode 226, a capacitor 228, and an invertor 230. The resistor 224 and diode 226 are connected in series between the strobe output terminal ST of the receiver 66 and an input terminal of the invertor 230. The input terminal of the invertor 230 is connected to the terminal B by the parallel combination of the capacitor 228 and resistor 232.

The strobe signal is delayed/debounced by a time constant determined by the value of the resistor 224 and capacitor 228. Once fired, the output signal of one shot 70 lasts for a time constant determined by the value of the resistor 232 and capacitor 228. The diode 226 does not allow the capacitor 228 to discharge after the strobe signal is removed.

The latch 68 is clocked by the strobe signal input through a conductor 237. The output of the one shot 70 is connected to the latch 68 through a conductor 236.

When the terminal B is initially connected to ground upon startup, an RC network (not shown) applies a pulse to clear any unknown data in the latch 68. The latch 68 may be a Quad D flip-flop, the output terminals of which are held in tri-state until the one shot 70 produce a high signal on its output enable pins, i.e. conductor 236. This happens when the decoder 18 is in the transmit mode. One of the output terminals of the latch 68 is connected through an inverter 235 to an input terminal of the NAND gate 196. The reader will recall that the NAND gate 196 inputs the expanded verification signal $V_s'$ to the converter 58. The latch 68 receives the binary data representative of the received DTMF signal at its input terminals and holds that data available at its output terminals.

The output terminal of the one shot 70 is also connected to an input terminal of the NAND gate 238. A second input terminal of the NAND gate 238 receives the expanded verification signal $V_s'$. An output terminal of the NAND gate 238 is connected to a base terminal of the transistor 208 through a resistor 240. The output terminal of the NAND gate 238 is additionally connected to supply the ground for the input amplifier 64 by the conductor 242 as discussed above.

This configuration allows the one shot 70 to control two functions. First, the one shot 70 controls the output enable pins of the latch 68. Secondly, through the NAND gate 238, resistor 240, and transistor 208, the one shot 70 controls which of the input amplifier 62 and output amplifier 64 is operative. When the decoder 18 is in the receive mode, the input amplifier 64 is grounded through the NAND gate 238 while the output amplifier 62 is not connected to the terminal B because the transistor 208 is non-conductive. When the decoder 18 is in the transmit mode, the output signal of the NAND gate 238 is high, thereby disabling input amplifier 64 and rendering transistor 208 conductive which in turn allows output amplifier 62 to become operative.

After a DTMF signal has been converted to binary information by the receiver 66, it is input to the converter 58 through the latch 68. The binary data is converted to a decimal equivalent signal which is input to the DTMF tone generator. In one embodiment, the decimal signal zero has been assigned to a standby condition. Decimal signals one through eight are assigned to dial out data, where ach digit is associated to a single row or column tone. When the signal representative of a nine is received, this signal is output by the converter 58 to the second input terminal of the NAND gate 122 via the conductor 126.

When the tone generator 60 outputs an appropriate single tone signal representative of the decimal signal, that signal is received by dialer 12 at the central location. If the dialer 12 receives an incorrect response or no response, it may hang up or, alternatively, generate the DTMF signal assigned as the end signal and the unsuccessful attempt at communicating with the decoder 18 may be recorded by the printer 16. If the received single tone signal is correct, i.e., representative of the random DTMF signal generated by dialer 12, dialer 12 generates a second random DTMF signal. This DTMF signal is again received, converted, and a corresponding single tone signal is transmitted by the decoder 18. This process may be repeated any number of times in order to verify that the dialer 12 is in communication with the decoder 18. It is anticipated that the generation of three random DTMF signals and the receipt of three corresponding single tone signals within the period of two seconds will ensure that no one can simulate communication between dialer 12 and decoder 18.

When the handshake has been completed, dialer 12 generates a DTMF signal which is converted by converter 58 to the decimal signal nine. This nine decimal signal is input to the NAND gate 122 by the conductor 126. This signal causes the signal available at the output terminal of the NAND gate 122 to change to a high level thereby changing the transistor 128 from a conductive to a non-conductive state. This will terminate the flow of current through the conductor 93 thereby allowing the normally open switch 41 to return to its normally open condition and the normally closed switch 39 to return to its normally closed condition. Thus, communication between dialer 12 and the decoder 18 may be terminated in one of two ways. Either the time period determined by the value of the capacitor 119 and resistor 120 times out, or dialer 12 generates a DTMF signal representative of the decimal signal nine. Either event deactivates the decoder 18 and recouples the remote telephone 20 to the telephone line. It is anticipated that the decoder need only be operative for a time period of approximately ten seconds to enable the decoder to power up, produce a verification signal if the proper object is inserted therein, and complete a handshake or security sequence with dialer 12 to verify that the dialer 12 is in communication with the proper decoder 18. Such an operation results in minimal intrusion upon the parolee or other person whose presence is being monitored.

i. Operation of Decoder to Produce Verification Signal

The operation of the decoder 18 shown in FIG. 3 to produce the verification signal $V_s$ may be summarized as follows:

Upon insertion of the object 27 into the decoder 18, the reed switch 45 is closed, allowing base current to momentarily flow to transistor 137 which in turn allows base current to flow to transistor 102;

The flow of base current to transistor 102 connects the power supply 43 across the conductors 35 and 37 thereby enabling the production of an output voltage $V_{cc}$ at the output terminals 114 and 115;

The availability of the output voltage $V_{cc}$ allows the capacitor 119 to quickly charge;

While the capacitor 119 is discharging, the output of the NAND gate 122 is low, thus rendering transistor 138 conductive;

With transistor 128 conductive, current flows through light emitting diodes 134 and 98 turning on transistors 137 and 91, respectively;

With transistor 137 held conductive by light emitting diode 134, transistor 102 is held conductive, thereby maintaining the decoder 18 coupled to the telephone line;

With the transistor 91 held conductive by the light emitting diode 89, the base and emitter terminals of the transistor 83 are shorted, thereby uncoupling the remote telephone 20 from the telephone line;

Terminal A is connected to ground through transistor 182 thereby rendering oscillators 150, 152, and 154 opertive;

Oscillator 150 continues to oscillate while oscillators 152 and 154 stop oscillating if the coded information 26 carried by the object 27 is correct;

When the oscillators 150, 152, and 154 are in the proper states, responsive to the coded information 26, the verification signal $V_s$ is available across capacitor 176;

The verification signal $V_s$ propagates through the current distribution circuit 54 rendering transistor 182 non-conductive and transistor 188 conductive;

One shot 56 provides an expanded verification signal $V_s'$ which is input to the converter 58 through the NAND gate 196;

Converter 58 produces a decimal equivalent signal which is input to the tone generator 60; and Tone generator 60 produces a single tone signal which is transmitted to dialer 12 through the output amplifier 62.

j. Operation of Decoder During Handshake

The operation of the decoder 18 shown in FIG. 3 to produce the handshake between the decoder 18 and dialer 12 can be summarized as follows:

The output signal available at the NAND gate 238 is low thereby enabling input amplifier 64 and holding transistor 208 non-conductive which disables output amplifier 62;

Input amplifier 64 receives a DTMF signal which is input to the DTMF receiver 66;

DTMF receiver 66 produces binary coded information representative of the DTMF signal which is available at output terminals $D_0$–$D_3$ and produces an output signal available at its strobe output terminal ST;

The strobe signal clocks latch 68 and causes the signal output from the one shot 70 to go low;

The low signal produced by the one shot 70 is input to the latch 68 and to the NAND gate 238;

The latch 68 holds the binary data available at the output terminals of the receiver 66 at the input terminals of the converter 58;

The output signal of the NAND gate 238 goes high thereby disabling the input amplifier 64 and rendering the transistor 208 conductive which enables the output amplifier 62;

The converter 58 produces a decimal equivalent signal which is input to the tone generator 60;

Tone generator 60 generates the corresponding single tone signal which is transmitted to the dialer 12 through output amplifier 62; and The output signal of the one shot 70 returns to its high condition which causes the output signal available at the output terminal of the NAND gate 238 to go low, thereby enabling input amplifier 64 and disabling output amplifier 62 in anticipation of receiving another DTMF signal from dialer 12.

The above procedure can be repeated any number of times in order to assure that dialer 12 is in communication with the decoder 18.

k. Other Embodiments

While the present invention has been described in connection with an exemplary embodiment thereof, it will be understood that many modifications and variations will be readily apparent to those of ordinary skill in the art. One such variation includes replacing a large number of the discrete components illustrated in FIG. 3 with a customized integrated circuit including a microcomputer. Such a design provides greater flexibility, increased security, lower cost, requires less board space, and reduces the component count. With such a microcomputer controlled decoder, a very complex handshake may be provided as well as a plurality of handshake modes. Remote programming of different codes and reprogramming to change the verification signal and handshake for each telephone inquire can be used to increase security. The verification signal and handshake sequence can be operated on the basis of both time and frequency, rather than just frequency as in the embodiment shown in FIG. 3. The handshake and signal throughput can be speeded up. Additionally, more than three oscillators may be used with each oscillator grounded separately and each output individually monitored. As has already been mentioned, such a decoder can be linked to other security devices such as a device for analyzing the monitored individual's breath. The decoder can also be programmed to provide additional information. For example, if an incorrect object is inserted, the decoder may advise the automatic dialer of the code of that incorrect object thereby enabling identification of that parolee or other individual. Clearly, the disclosed monitoring system is extremely flexible. Accordingly, this application and the following claims are intended to cover all such modifications and variations.

What is claimed is:

1. A monitoring system for monitoring the presence of a person at a remote location through a telephone line, comprising:
   means at a central location for automatically establishing a telephone link between the central and remote locations;
   an object;
   means for attaching said object to said person and indicating if said attachment has been tampered with; and
   decoder means at the remote location said decoder means including means for receiving said object and means for producing a verification signal and transmitting the verification signal to said central location upon insertion of said object into said object-receiving means.

2. The system of claim 1, wherein said decoder means includes means responsive to the insertion of said object for coupling said decoder means to said telephone line and for uncoupling a telephone at said remote location from said telephone line while said decoder means is coupled thereto.

3. The system of claim 2, wherein said means responsive to the insertion of said object includes means for enabling and wherein said object includes means for operating said means for enabling.

4. The system of claim 3, wherein said means for enabling includes a reed switch and wherein said means for operating includes a magnet for operating said reed switch.

5. The system of claim 2, wherein said means for coupling and uncoupling includes a normally open switch and a normally closed switch.

6. The system of claim 5 wherein said decoder means includes a power supply adapted to draw power from said telephone line, and means for connecting said power supply to the telephone line when said normally open switch is closed so that said power supply produces an output voltage when said normally open switch is closed, said means for coupling and uncoupling including means for closing said normally open switch upon insertion of said object into said object-receiving means.

7. The system of claim 6, wherein said decoder means includes means for timing out a predetermined time period in response to the production of said output voltage maintaining said normally open switch closed and maintaining said normally closed switch open during said predetermined time and opening said normally open switch and closing said normally closed switch upon lapse of said predetermined time.

8. The system of claim 1, wherein said decoder means includes means for generating a security sequence and said means at said central location includes means for detecting said security sequence.

9. The system of claim 8, wherein said means at said central location includes means for transmittiang a handshake signal via said telephone line and said means for generating a security sequence includes receiving means responsive to said handshake signal and transmitting means responsive to said receiving means.

10. The system of claim 9, wherein said means for transmitting a handshake signal includes means for transmitting a single tone signal and wherein said receiving means includes a single tone receiver.

11. The system of claim 9, wherein said means for transmitting a handshake signal includes means for transmitting dual-tone multifrequency signals and wherein said receiving means includes a dual-tone multifrequency receiver.

12. The system of claim 11, wherein said decoder means includes means responsive to said dual-tone multifrequency receiver for converting a received dual-tone multifrequency signal into a decimal equivalent signal, and wherein said means for transmitting includes a tone generator responsive to said decimal equivalent signal for transmitting a corresponding single tone signal to the central location.

13. The system of claim 12, wherein said means for transmitting a handshake signal includes means for transmitting a plurality of dual-tone multifrequency signals from the central location, whereby said tone generator will transmit a plurality of said corresponding single tone signals to the central location.

14. The system of claim 1, wherein said decoder means includes a first portion for generating said verification signal, a second portion for transmitting said verification signal to the central location, a power supply adapted to draw power from the telephone line, and a power distribution circuit for connecting said first and second portions to said power supply alternatively so that only one of said portions is connected to said power supply at any time.

15. The system of claim 14, wherein said power distribution circuit includes a first switch for selectively connecting said first portion to said power supply and a second switch for selectively connecting said second portion to said power supply.

16. The system of claim 15, wherein said power distribution circuit includes an inverter controlling said first switch in response to said verification signal, and a second inverter controlling said second switch in response to said first inverter.

17. The system of claim 1, additionally comprising a timer at the central location, said means at the central location for automatically establishing a telephone link being responsive to said timer.

18. The system of claim 1, additionally comprising means at the central location for providing observable indicia regarding whether the presence of the person at the remote location was indicated.

19. The system of claim 1, wherein said object is carried by a bracelet.

20. The system of claim 19, wherein said bracelet includes means for indicating if said bracelet has been tampered with.

21. The system of claim 19, wherein said decoder means includes a sensor located proximate to said means for receiving an object for sensing said coded information when said object is inserted in said means for receiving an object.

22. The system of claim 21, wherein said sensor includes a plurality of means having first and second states responsive to said coded information, and wherein said verification signal is produced in response to each of said means being in a predetermined one of said first and second states.

23. The system of claim 22, wherein said plurality of means includes a plurality of oscillators.

24. The system of claim 23, wherein said object includes at least one metallic member positioned at a predetermined location within said object, said means for receiving said object including means for positioning said object at a predetermined location with respect to said plurality of oscillators.

25. The system of claim 24, wherein said metallic member causes at least one of said plurality of oscillators to change states when said object is inserted into said means for receiving an object.

26. The system of claim 2 wherein said means at said central location includes means for transmitting an audible instruction signal through the telephone link and through the telephone at the remote location to thereby instruct said person to insert said object into said object-receiving means.

27. The system of claim 7 wherein said decoder includes means for connecting said telephone at said remote location to said telephone line through said normally closed switch, whereby said telephone at said remote location will be decoupled from said telephone line during said predetermined time.

28. The system of claim 1 wherein said object is substantially inert.

29. The system of claim 1 wherein said object does not incorporate a power source.

30. The system of claim 1, wherein said decoder means includes a sensor for producing predetermined signals upon insertion of said object into said object-receiving means, and means for producing said verification signal in response to the production of said predetermined signals.

31. The system of claim 30, wherein said object includes a portion of a bracelet and wherein said means for receiving an object includes means specifically configured to receive said portion of said bracelet.

32. The system of claim 30, wherein said means for producing said verification signal includes logic means responsive to said predetermined signals.

33. The system of claim 32, wherein said decoder means includes a toner generator for transmitting said verification signal to said central location.

34. The system of claim 33, wherein said decoder means includes a power supply adapted to draw power from the telephone line and a power distribution circuit for providing power from said power supply to said sensor and said tone generator alternately so that power is supplied to only one of said sensor and said tone generator at any time.

35. A monitoring system for indicating the presence of a person at a remote location through a telephone line, comprising:

means at a central location for automatically establishing a telephone link between the central and remote locations;

decoder means at the remote location for producting a verification signal in response to an action performed by the person whose presence is to be verified and transmitting said verification signal through the telephone line to the central location to indicate the presence of the person at the remote location;

said decoder means including means for receiving an object and means responsive to the insertion of said object into said means for receiving an object for coupling said decoder means to said telephone line and for uncoupling said remote telephone from said telephone line while said decoder means is coupled thereto;

said means for coupling and uncoupling including a normally open switch and a normally closed switch;

said decoder means including a power supply, said power supply being sourced from the telephone line to produce an output voltage when said normally open switch is closed;

said decoder means including means for timing out a predetermined time period in response to the production of said output voltage, said normally open switch and said normally closed switch being responsive to said timing means;

said decoder means also including a further switch connecting said normally open switch and said normally closed switch to said power supply, and a logic gate controlling said further switch, said logic gate being responsive to said timing means.

36. The system of claim 35, wherein said decoder means includes receiver means for receiving signals from the central location, and wherein said logic gate is further response to said receiver means for controlling said further switch.

37. A monitoring system for indicating the presence of a person at a remote location through a telephone line, comprising:

means at a central location for automatically establishing a telephone link between the central and remote locations; and decoder means at the remote location for producing a verification signal in response to an action performed by the person whose presence is to be verified and transmitting said verification signal through the telephone line to the central location to indicate the presence of the person at the remote location;

said means at the central location for automatically establishing a telephone link including means for transmitting dual-tone multifrequency signals;

said decoder means including a dual-tone multifrequency receiver and means responsive to said dual-tone multifrequency receiver for converting a received dual-tone multifrequency signal into a decimal equivalent signal, said decoder means also including means for transmitting, said means for transmitting including a tone generator responsive to said decimal equivalent signal for transmitting a corresponding single tone signal to the central location;

said decoder means also including an input amplifier responsive to said dual-tone multifrequency signal transmitted from the central location and an output amplifier responsive to said single tone signal.

38. The system of claim 37, wherein said decoder means includes a power supply and means for connecting one of said input amplifier and said output amplifier to said power supply.

39. A decoder for producing and transmitting a verification signal over a telephone line, comprising:

means for receiving an object;

coupling means responsive to the insertion of said object for coupling said means for supplying power to a telephone line and for uncoupling a telephone from the telephone line;

means for analysing said object to determine if a predetermined code is present on said object and for producing a verification signal in response to said analysis; and communication means for transmitting said verification signal over the telephone line;

said coupling means being further responsive to said communication means for uncoupling said means for supplying power from the telephone line and for coupling the telephone to the telephone line.

40. The decoder of claim 39, additionally comprising power distribution means for connecting said means for analyzing and said communication means to said means for supplying power alternately so that only one of said means for analyzing and said communication means is connected to said power supply at any time, said means for supplying power being adapted to draw power from the telephone line.

41. The decoder of claim 39, further comprising means for receiving a handshake signal transmitted through the telephone line, and actuating said means for transmitting to transmit a security sequence over the telephone line.

42. A system for monitoring a plurality of persons in a community, each said person having an assigned remote location within the community, the system comprising:

(a) telephone dialer means at a central location for automatically initiating telephone calls from said central location via a telephone exchange serving the community to each of said remote locations, thereby periodically establishing a telephone link between the central location and each of said remote locations;

(b) instruction signal means for automatically providing an instruction signal perceptible to the monitored person at each said remote location while that remote location is linked to said central location, whereby the monitored person is instructed to perform a predetermined action resulting in transmission of return signals from the remote location to the central location via the telephone link; and (c) test means at said central location for automatically testing the return signals from each of said remote locations to determine whether such return signals indicate that said predetermined action has been performed by the person assigned to that location.

43. A system for monitoring a plurality of persons in a community, each said person having an assigned remote location within the community, the system comprising:

(a) telephone dialer means at a central location for automatically initiating telephone calls from said central location via a telephone exchange serving the community to each of said remote locations, thereby periodically establishing a telephone link between the central location and each of said remote locations;

(b) instruction signal means for automatically providing an instruction signal perceptible to the monitored person at each said remote location while that remote location is linked to said central location, whereby the monitored person is instructed to perform a predetermined action resulting in transmission of return signals from the remote location to the central location via the telephone link;

(c) test means at said central location for automatically testing the return signals from each of said remote locations to determine whether such return signals indicate that said predetermined action has been performed by the person assigned to that location; and (d) a plurality of identifying objects, one such identifying object being associated with each of the persons to be monitored, and means for attaching each said identifying object to the associated person and indicating if such attachment has been tampered with;

said test means including means for determining whether the identifying object associated with the persons assigned to a particular remote location has been employed to generate the return signals received from that location.

44. A system as claimed in claim 43 further comprising decoder means at each of said remote locations for producing a predetermined verification signal upon engagement with the decoder means of the identifying object associated with the person assigned to that location, said means for determining whether said identifying object assigned to the person has been used to generate the return signal including means for detecting said predetermined verification signal.

45. A system as claimed in claim 44 wherein each said decoder means includes means for disabling a telephone at the remote location so that said telephone is disabled when said predetermined verification signal is transmitted.

46. A system as claimed in claim 45 wherein said means for providing an instruction signal includes means for transmitting an audible instruction signal from said central location via each said telephone link to said telephone at the remote location.

47. A system as claimed in claim 44 wherein said identifying objects do not include power sources.

48. A system as claimed in claim 43, further comprising means at said central location for recording said return signals.

49. A method of monitoring a plurality of persons in a community, each said person having an assigned remote location within the community, the method of comprising the steps of:
(a) automatically initiating telephone calls from a central location to each of said remote locations via a telephone exchange serving the community to thereby periodically establish telephone links between the central location and each of said remote locations;
(b) instructing the person assigned to the remote location to perform a predetermined action resulting in transmission of return signals from the remote location to the central location via the telephone link by automatically providing an instruction signal perceptible to the person at each said remote location while that remote location is linked with the central location; and
(c) automatically monitoring and testing at said central location said return signals from each of said remote locations to determine whether the predetermined action has been performed by the person assigned to that location.

50. A method of monitoring a plurality of persons in a community, each said person having an assigned remote location within the community, the method of comprising the steps of:
(a) automatically initiating telephone calls from a central location to each of said remote locations via a telephone exchange serving the community to thereby periodically establish telephone links between the central location and each of said remote locations;
(b) instructing the person assigned to the remote location to perform a predetermined action resulting in transmission of return signals from the remote location to the central location via the telephone link by automatically providing an instruction signal perceptible to the person at each said remote location while that remote location is linked with the central location;
(c) automatically monitoring and testing at said central location said return signals from each of said remote locations to determine whether the predetermined action has been performed by the person assigned to that location; and
(d) providing each said person with an identifying object and attaching each said object to the parolee so that tampering with said attachment can be detected, said step of testing the return signals from each remote location including the step of determining whether the identifying object was used in generating the return signals.

51. A method as claimed in claim 50 further comprising the steps of providing decoder means at each said remote location for producing a predetermined verification signal upon engagement with the decoder means of the identifying object secured to the person assigned to that location, said step of testing the return signals including the step of detecting the presence or absence of said predetermined verification signal.

52. A method as claimed in claim 51 wherein said step of providing an instruction signal includes the step of transmitting an audible signal from said central location to each remote location through a telephone at each remote location.

53. A method as claimed in claim 52 further comprising the step of automatically disabling said telephone at each remote location so that the telephone is disabled when the verification signal is produced at that location, whereby the person at that location cannot hear the verification signal through the telephone.

54. A method as claimed in claim 51 further comprising the step of generating a security sequence in each said decoder means, transmitting said security sequence to said central location via the telephone link and detecting said security sequence to thereby verify that said decoder means is connected at the remote location.

55. A method as claimed in claim 54 further comprising the step of transmitting a handshake signal from said central location to each said remote location via the telephone link, said step of generating a security sequence in the decoder means including the step of translating the handshake signal transmitted from the central location according to a predetermined translation scheme.

56. A method as claimed in claim 55 further comprising the step of varying the handshake signal transmitted from said central location, whereby the security sequence generated in each said decoder means will also vary.

57. A method as claimed in claim 50, further comprising the step of recording said return signals at said central location.

* * * * *

UNITED STATES PATENT AND TRADEMARK OFFICE
CERTIFICATE OF CORRECTION

PATENT NO. : 4,747,120

DATED : May 24, 1988

INVENTOR(S) : Steven L. Foley

It is certified that error appears in the above-identified patent and that said Letters Patent is hereby corrected as shown below:

Column 1, line 9, "individual" should read --individuals--.
Column 2, line 47, "transponder/receiver s" should read
     --transponder/receiver is--.
Column 5, line 11, "hand" should read --hang--.
Column 7, line 20, "$V_5$," should read --$V_S'$--.
Column 8, line 66, "incouples" should read --uncouples--.
Column 9, line 68, "power" should read --proper--.
Column 14, line 65, "voltage" should read --voltages--.
Column 19, line 27, "ach" should read --each--.
Column 20, line 29, "138" should read --128--.
Column 21, line 49, "inquire" should read --inquiry--.
Column 22, line 58, "transmittiang" should read --transmitting--.
Column 23, line 24, "alternatively" should read --alternately--.
Column 24, line 35, "toner" should read --tone--.
Column 27, lines 4-5, "persons" should read --person--.

Signed and Sealed this

Twenty-seventh Day of December, 1988

Attest:

DONALD J. QUIGG

Attesting Officer

Commissioner of Patents and Trademarks